United States Patent
Fankhauser et al.

(10) Patent No.: US 11,609,830 B2
(45) Date of Patent: Mar. 21, 2023

(54) METHOD FOR INVESTIGATING A FUNCTIONAL BEHAVIOR OF A COMPONENT OF A TECHNICAL INSTALLATION, COMPUTER PROGRAM, AND COMPUTER-READABLE STORAGE MEDIUM

(71) Applicant: SIEMENS MOBILITY GMBH, Munich (DE)

(72) Inventors: Martin Fankhauser, Munich (DE); Thomas Mueller, Eggstaett (DE); Dennis Klingebiel, Atlanta, GA (US)

(73) Assignee: Siemens Mobility GmbH, Munich (DE)

( * ) Notice: Subject to any disclaimer, the term of this patent is extended or adjusted under 35 U.S.C. 154(b) by 415 days.

(21) Appl. No.: 16/643,655

(22) PCT Filed: Jul. 26, 2018

(86) PCT No.: PCT/EP2018/070319
§ 371 (c)(1),
(2) Date: Mar. 2, 2020

(87) PCT Pub. No.: WO2019/042671
PCT Pub. Date: Mar. 7, 2019

(65) Prior Publication Data
US 2020/0241979 A1     Jul. 30, 2020

(30) Foreign Application Priority Data
Sep. 1, 2017   (DE) .......................... 102017215341.5

(51) Int. Cl.
*G06F 11/16*     (2006.01)
*B25J 19/00*     (2006.01)
*G06K 9/62*     (2022.01)

(52) U.S. Cl.
CPC ....... *G06F 11/1608* (2013.01); *B25J 19/0075* (2013.01); *G06K 9/6215* (2013.01); *G06K 9/6221* (2013.01)

(58) Field of Classification Search
CPC ... G06F 11/1608; G06F 17/18; B25J 19/0075; G06K 9/6215; G06K 9/6221;
(Continued)

(56) References Cited

U.S. PATENT DOCUMENTS 6,108,616 A    8/2000   Borchers et al.
8,261,132 B2   9/2012   Klein et al.
(Continued)

FOREIGN PATENT DOCUMENTS

DE        3734487 A1    4/1989
DE     19732046 A1    1/1999
(Continued)

*Primary Examiner* — Thien Nguyen
(74) *Attorney, Agent, or Firm* — Laurence A. Greenberg; Werner H. Stemer; Ralph E. Locher

(57) ABSTRACT

An improved method for investigating a functional behavior of a component of a technical installation includes comparing a signal of the component to be investigated and representing the functional behavior of the component with a reference signal which describes an average functional behavior of identical components. During the comparison, a comparison variable describing the deviation of the signal from the reference signal is determined. In addition, a probability of the occurrence of the comparison variable is determined by using a predefinable distribution of a multiplicity of such comparative variables. A computer program and a computer readable storage medium are also provided.

14 Claims, 2 Drawing Sheets

(58) Field of Classification Search
CPC .......... B61L 27/40; B61L 27/53; B61L 27/57; B61L 15/0081; B61L 15/0072; G05B 23/0235; G05B 23/0237; G01M 17/10
See application file for complete search history.

(56) References Cited

U.S. PATENT DOCUMENTS

| | | | |
|---|---|---|---|
| 2007/0115800 A1* | 5/2007 | Fonseka | H04L 1/0054 370/208 |
| 2007/0150220 A1 | 6/2007 | Bode | |
| 2010/0189051 A1 | 7/2010 | Li et al. | |
| 2011/0137432 A1 | 6/2011 | Wang et al. | |
| 2014/0006330 A1 | 1/2014 | Biem | |
| 2014/0136137 A1* | 5/2014 | Tarshish-Shapir | G01N 21/4788 702/108 |
| 2015/0213706 A1 | 7/2015 | Bai et al. | |
| 2016/0140009 A1* | 5/2016 | Watanabe | G05B 23/0237 702/186 |
| 2017/0288811 A1* | 10/2017 | Tosato | H04L 1/0054 |
| 2020/0241979 A1* | 7/2020 | Fankhauser | B61L 27/40 |

FOREIGN PATENT DOCUMENTS

| | | |
|---|---|---|
| DE | 19961631 A1 | 6/2001 |
| DE | 102005053648 A1 | 5/2007 |
| DE | 102006019896 A1 | 10/2007 |
| EP | 1542108 A1 | 6/2005 |
| JP | 2012144068 A | 8/2012 |
| RU | 2364911 C2 | 8/2009 |
| WO | WO2016191711 A1 | 12/2016 |

\* cited by examiner

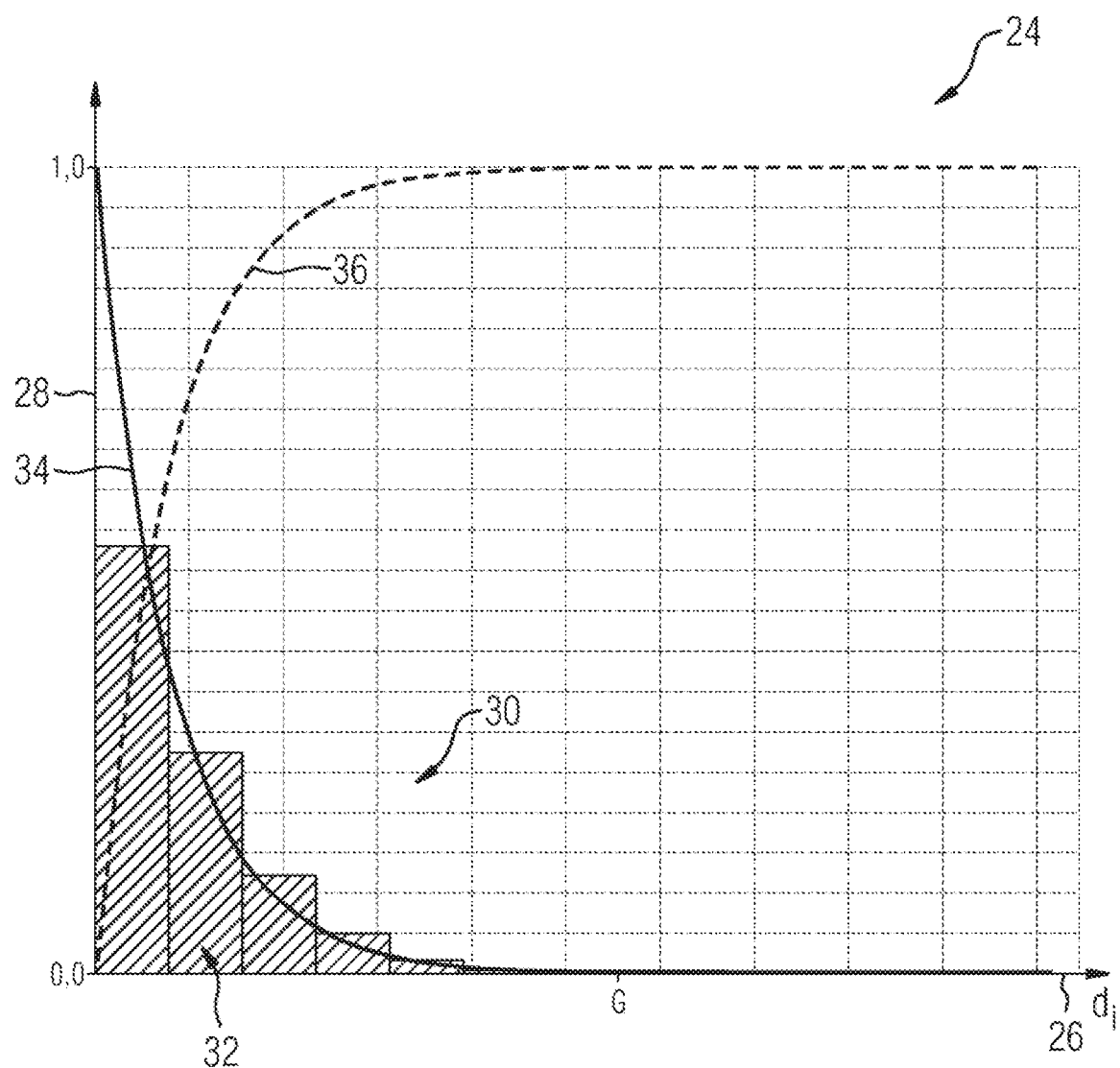

METHOD FOR INVESTIGATING A FUNCTIONAL BEHAVIOR OF A COMPONENT OF A TECHNICAL INSTALLATION, COMPUTER PROGRAM, AND COMPUTER-READABLE STORAGE MEDIUM

BACKGROUND OF THE INVENTION

Field of the Invention

The invention relates to a method for investigating a functional behavior of a component of a technical installation.

It is known that those components of a compnt type which are exhibiting unusual or abnormal behavior can be detected or identified as being non-functional. For example, a current operating parameter value of a component to be investigated is compared with a fixed threshold value. For example, if the operating parameter value of the component to be tested is greater than the fixed threshold, it is detected that the component to be investigated is displaying an abnormal behavior. Determining which threshold value to use is difficult and subject to great uncertainty. Often, the threshold values are specified on the basis of experience values or are arbitrarily chosen. External factors such as ambient conditions (e.g. ambient temperature, humidity, etc.) and/or installation-dependent factors (e.g. running time of the installation, operating temperatures of surrounding components, etc.) are ignored as far as possible.

Thus, for example, the specifications DE 199 61 631 A1, DE 37 34 487 A1, DE 197 32 046 A1 and EP 1 542 108 A1 teach different methods for monitoring a component of a technical installation, in each of which a signal representing the functional behavior of the component to be investigated is compared with a predefined reference signal.

SUMMARY OF THE INVENTION

An object of the invention is to specify an improved, more accurate method for investigating a functional behavior of a component of a technical installation.

The object is achieved by a method for investigating a functional behavior of a component of a technical installation, in which according to the invention a signal of the component that represents the functional behavior of the component is compared with a reference signal which describes an average functional behavior of identical components. According to the invention, during the comparison a comparison variable describing the deviation of the signal from the reference signal is determined. This means that the comparison variable preferably describes the deviation of the signal of the component to be investigated from the reference signal. Further, a probability of occurrence of the comparison variable is determined using a definable distribution of a plurality of such comparison variables.

Advantageously, the functional behavior is assessed on the basis of the probability of occurrence of the comparison variable. The probability of occurrence of the comparison variable is preferably a measure of the functional behavior of the component to be investigated, in particular a measure of whether the component to be investigated is behaving normally, in particular whether the component to be investigated is fully functional.

The probability of occurrence of the comparison variable is advantageously dependent on the plurality of such comparison variables, on the basis of which, in particular, the definable distribution is determined. The plurality of such comparison variables can be updated, in particular periodically. In this way, the functional behavior of the component to be investigated can be tested and/or assessed using a dynamic criterion, namely the probability of occurrence.

A further advantage of the method according to the invention is its high sensitivity. This means that even small deviations of the signal of the component to be investigated from the reference signal can be detected.

The signal from the signal component to be investigated can be an unprocessed signal. In addition, the signal from the component to be investigated can be a post-processed signal. In particular, the signal of the component to be investigated can be filtered and/or smoothed. Furthermore, the signal of the component to be investigated can be an average value of multiple signals and/or a convolution of multiple signals.

In an advantageous design of the invention the comparison variable is a maximum cumulative deviation between the signal of the component to be investigated and the reference signal.

The signal from the component to be tested can comprise a plurality of operating parameter values, in particular as a function of time. Furthermore, the reference signal can comprise multiple reference values, in particular as a function of time.

The signal of the components to be tested and/or the reference signal can be smoothed. Furthermore, the signal of the component to be investigated and/or the reference signal can be normalized. In particular, the operating parameter values of the signal, or the operating parameter values for short, and/or the reference values of the reference signal, the reference values for short, can be normalized.

It is advantageous if the operating parameter values are accumulated over time. Further, it is preferable if the reference values are accumulated over time. Preferably, a deviation, also a cumulative deviation, between the cumulative operating parameter values and the cumulative reference values is calculated as a function of time.

Advantageously, a maximum cumulative deviation, also a maximum cumulative distance, between the cumulative operating parameter values and the cumulative reference values is determined as the comparison value. The maximum cumulative deviation corresponds advantageously to the maximum of the above-mentioned deviation between the cumulative operating parameter values and the cumulative reference values.

An operating parameter can be, for example, a temperature, a vibration parameter, a loudness, a voltage, an electric current, a consumed/converted power, a rotational frequency or similar. Further, the operating parameter can be one which can be determined from a plurality of parameters.

Advantageously, the operating parameter values and/or the reference values are time-dependent. In this way, the signal from the component to be investigated and/or the reference signal can be time-dependent.

For example, the operating parameter values and/or the reference values may be or have been determined directly as a function of time. Further, the operating parameter values and/or the reference values can be determined indirectly as a function of time, for example as a function of a running time, which is in turn time-dependent.

In addition, the operating parameter values and/or the reference values may be accumulated directly over time. In addition, the operating parameter values and/or the reference values may be accumulated indirectly over time, for example via the running time.

Preferably the comparison variable is determined using a statistical test, in particular a so-called Kolmogorov-Smirnov test.

In addition, in particular alternatively, the comparison variable can be a maximum Euclidean distance between the signal of the component to be investigated and the reference signal.

Advantageously, in order to determine the maximum Euclidean distance the operating parameter values are compared with the reference values. The maximum Euclidean distance is preferably the maximum deviation between an operating parameter value at any given instant and a reference value at the same instant.

In addition, the comparison variable can be normalized using the time, one or more of the reference values, a constant and/or another value.

The reference signal, in particular the reference values, can be simulated. Furthermore, the reference signal, in particular the reference values, can be estimated using a hypothetical probability density function.

In a preferred configuration of the invention, the reference signal is determined empirically. This means that it is preferable if the reference values are determined empirically.

The signal of the component to be investigated advantageously describes the functional behavior of the component within a specified time interval. In addition, the reference signal preferably describes an average functional behavior of identical components within the same period of time.

In this way, external, in particular time-dependent, influences such as environmental factors can be taken into account in the same way both for the signal of the component to be investigated and for the reference signal. In other words, in this way a normalization of the external influences can be performed.

In principle, the reference signal can also describe an average functional behavior of identical components within a different time interval, for example, within a previous time interval.

Identical components can be understood to mean components which are of the same type as the component to be tested. The reference signal preferably describes an average functional behavior of multiple components which are the same as the component to be investigated.

Further, it is advantageous if the reference signal is an average over multiple signals of multiple identical components of the same technical installation.

The multiple signals of the multiple identical components can each contain multiple signal values. In particular, a respective reference value can be an average of multiple signal values (in particular, of the multiple signals) at a specific time. In particular, a respective reference value can be a mean value, for example an arithmetic mean, a median or a modal value, of the multiple signal values at the given time. This means that in the averaging the mean value of the multiple signal values is calculated, in particular, at a specific point in time. Furthermore, a respective reference value can be determined using a (different) location parameter, e.g. using a quantile of the multiple signal values, at the specific point in time.

In the averaging of the multiple signals of the multiple identical components, a weighting of the signals can be performed.

If the reference signal is an average derived from the multiple signals of the multiple identical components of the same technical installation, then external factors, in particular, system-dependent factors, such as the effects of a running time of the installation, effects of a service implemented by the installation or the like, can be taken into account in the same way both for the signal of the component to be investigated and for the reference signal. In other words, in this way a normalization of the external influences can be performed. This eliminates the need for modeling external factors.

In principle, the reference signal can also be an average over a plurality of signals of a plurality of identical components of at least one other technical installation.

An identical component can be another component of the same component type, in particular of the same technical installation. Preferably, components of the same component type are identical in design.

Also, an identical component can be an identically responding component of a different component type, in particular, of the same technical installation. The phrase 'identically responding' can be understood to mean responding in the same way to external factors. Advantageously, the identically responding component responds to external influences in a similar or identical way as the component to be investigated. In particular, the identically responding component can respond in the same manner as the component to be investigated to a running time of the installation, to a service implemented by the installation, to environmental factors (such as an ambient temperature), etc.

Advantageously, a limit value is defined for the probability of occurrence of the comparison variable, in short: for the probability of occurrence. The limit value can specify the probability of occurrence above which a behavior of the component to be investigated is deemed to be normal, or should be detected as normal. The limit value can be, for example, 5% (i.e. 0.05), 1% (i.e. 0.01), 0.5% (i.e. 0.005) or 0.1% (i.e. 0.001).

If the probability of occurrence of the comparison variable is greater than the specified limit value, a normal behavior of the component to be investigated is detected. A normal behavior can be an expected behavior.

This means that in the (specifiable) distribution of the plurality of such comparison variables, in particular using the limit value, a range can be specified for expected behavior or for normal behavior, in which advantageously a normal behavior of the component to be investigated is detected.

If the probability of occurrence of the comparison variable is less than the specified limit value, an abnormal behavior of the component to be investigated is preferably detected. An abnormal behavior can be an unexpected behavior. For example, an abnormally behaving component may be not fully functional and/or deemed to be not fully functional.

The probability of occurrence of the comparison variable is determined using a specifiable distribution of a plurality of such comparison variables.

Preferably, the plurality of such comparison variables already exists. For example, the distribution of the plurality of such comparison variables may be specified. Further, the specifiable distribution of the plurality of such comparison variables may be determined on the basis of the plurality of such comparison variables.

Further, the plurality of such comparison variables can be determined.

In particular, the plurality of such comparison variables is determined, for example, by allowing a respective comparison variable to be determined for multiple components and/or for multiple time intervals in the same way as previously described. On the basis of the determined comparison variables, the distribution (of the plurality of such comparison variables) can be determined.

The probability of occurrence advantageously depends on the specified distribution of the plurality of such comparison variables. In this way, the probability of occurrence is dependent on the plurality of such comparison variables. Advantageously, the more of these comparison variables that are or have been determined, the more stable the method is. Moreover, the plurality of such comparison variables can be (at least partially) updated. In particular, in the updating additional comparison variables can be included in the set of the plurality of such comparison variables. As a result of the updating of the plurality of such comparison variables, the distribution of the plurality of the comparison variables can be updated. In this way, the method can be self-learning.

Advantageously, the specified distribution of the plurality of such comparison variables is preferably determined by, for multiple time intervals, comparing a signal of the respective time interval, representing the functional behavior of at least one identical component, with a respective reference signal which preferably describes an average functional behavior of identical components within the same respective time interval. For example, for multiple time intervals a signal of the respective time interval representing the functional behavior of the component to be investigated can be compared with a respective reference signal, which preferably describes an average functional behavior of identical components within the same respective time interval.

In each comparison, in particular to determine the distribution of the plurality of such comparison variables, a comparison variable describing the deviation of the signal from the reference signal is preferably determined in each case. On the basis of the multiple comparison variables, the distribution of the plurality of such comparison variables can be determined.

Furthermore, it is expedient if the specified distribution of the plurality of such comparison variables is determined by, for multiple components of the same component type, in particular of the same technical installation and/or at least one other technical installation of the same installation type, a signal of the respective component representing the functional behavior of the respective component being compared with a reference signal, which advantageously describes an average functional behavior of identical components, in particular of the respective installation. In each comparison, in particular to determine the distribution of the plurality of such comparison variables, a comparison variable describing the deviation of the signal from the reference signal is preferably determined in each case. On the basis of the multiple comparison variables, the distribution of the plurality of such comparison variables can be determined.

Furthermore, the invention is directed towards a computer program having commands which, when the computer program is executed on a computer, causes said computer to execute the above-mentioned method and/or one of its refinements.

In addition, the invention is directed towards a computer readable storage medium having commands which, when the computer program is executed by a computer, cause said computer to execute the above-mentioned method and/or one of its refinements.

The description of advantageous embodiments of the invention given so far contains numerous features, some of which are combined together in the individual dependent claims. However, these features can also be advantageously considered individually and combined to form other meaningful combinations. In particular, these features can be combined individually and in any suitable combination with the method according to the invention, the computer program according to the invention and the computer-readable storage medium. Thus, method features are also to be regarded as properties relating to the subject matter of the corresponding computer program and/or the corresponding computer-readable storage medium and vice versa.

Even if in the description or in the claims some of the terms are used in the singular or in conjunction with a numeral, the scope of the invention for these terms shall not be restricted to the singular or the respective numeral.

The properties, features and advantages of the present invention and the manner in which these are achieved will become clearer and more comprehensible in conjunction with the following description of the exemplary embodiment, which is explained in more detail in connection with the drawings. The exemplary embodiment serves as the explanation of the invention and does not limit the invention to the combination of features specified therein, which includes functional features. In addition, appropriate features of any exemplary embodiment can also be explicitly considered in isolation, separately from any exemplary embodiment, incorporated into another exemplary embodiment in order to supplement its provisions, and combined with any one of the claims.

BRIEF DESCRIPTION OF THE SEVERAL VIEWS OF THE DRAWING

Shown are.

DETAILED DESCRIPTION OF THE INVENTION

Figure 1:
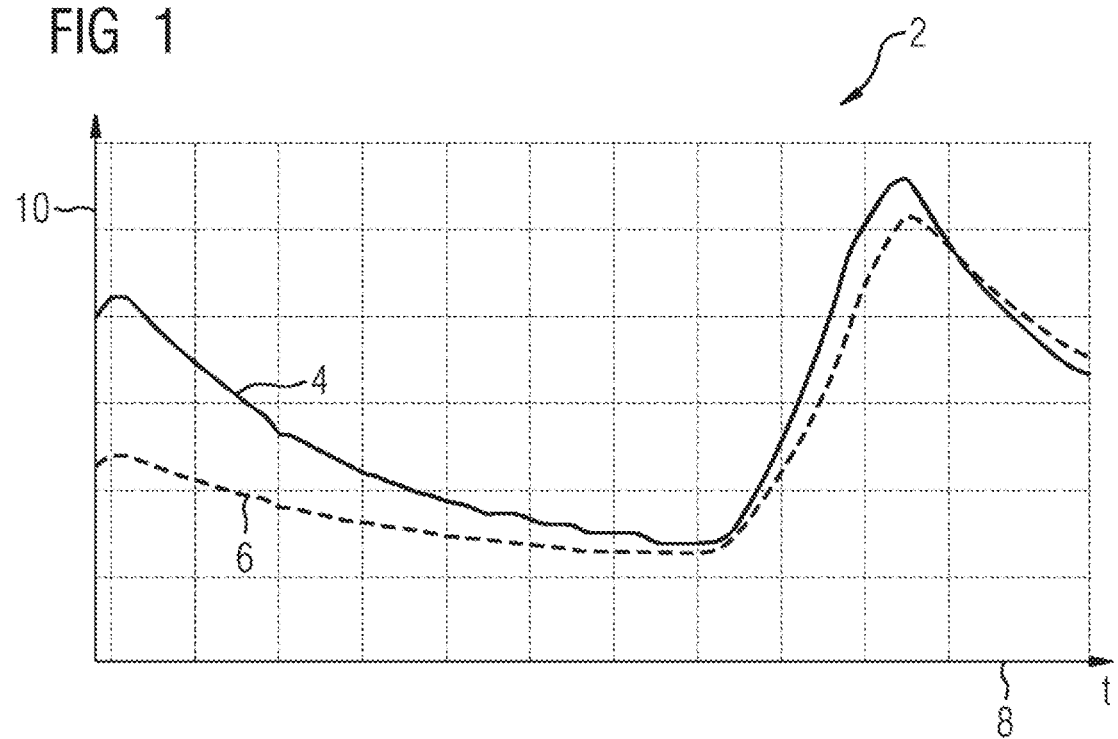
FIG. 1 a first graph showing a signal of a component to be investigated representing the functional behavior of the component, and a reference signal which describes an average functional behavior of identical components, FIG. 2 a second graph for determining a comparison variable which describes the deviation of the signal of the component to be investigated from FIG. 1 from the reference signal of FIG. 1, and FIG. 3 a third graph for determining a probability of occurrence of the comparison variable of FIG. 2 using a specified distribution of a plurality of such distribution variables.

FIG. 1 shows a diagram 2 with a signal 4 of a component to be investigated, representing the functional behavior of the component. The diagram further comprises a reference signal 6, which describes an average functional behavior of identical components.

On the x-axis 8 of the graph 2 the time t is plotted. On the y-axis 10 of the graph 2 an operating parameter is plotted.

In this example, the component to be investigated is a wheelset bearing of a rail vehicle. The identical components are other wheelset bearings of the same rail vehicle, in particular all the other wheelset bearings of the same rail vehicle. Each wheelset bearing comprises a sensor which detects values of an operating parameter. The operating parameter is sensitive to damage to the wheelset bearing.

In this example, the operating parameter is a temperature of the respective component, in this case the respective wheelset bearing.

The sensors determine (quasi-)continuous values of the operating parameter, operating parameter values for short, in this example with a frequency of $f=1$ min$^{-1}$.

Each wheelset bearing can also comprise a plurality of sensors whose signals are then averaged to form a signal of the respective component. Further, the operating parameter values can be smoothed.

For each wheelset bearing $R_i$ with i=1, 2, ... N each signal comprises operating parameter values $x_{Ri}(t)$ as a function of time t.

In this example, the component $R_1$ (i.e. i=1) is the component to be investigated. The signal 4 of the component to be investigated comprises the operating parameters $x_{Ri}$ with i=1.

The reference signal 6 is calculated by calculating the expected curve $\hat{X}_{Ri}(t)$ of all other wheelset bearings $R_j$ with j≠i. To this end a mean value is determined, here an arithmetic mean, of the operating parameters $x_{Rj}$ of the wheelset bearings $R_j$ with j≠i:

$$\hat{x}_{R_i}(t) = \text{avg}(x_{R_j}(t)) \text{ with } J \neq i, \text{ here } j=2 \ldots N$$

In principle, the mean value could also be a median, a modal value or a quantile.

In principle, it is possible that statistical and/or systematic fluctuations of at least one signal can be allowed for using a correction factor for the fluctuating signal. For the sake of better clarity, no correction factors have been introduced here.

As an example of the signal 4 of the component to be investigated, FIG. 1 shows the progression over time of the temperature of the wheelset bearing to be tested ($R_i$ with i=1) within a specified time interval as a continuous line. Also, as a reference signal 6 FIG. 1 shows the progression over time of the temperature of all other wheelset bearings ($R_j$ with j=2 ... N) on the same rail vehicle within the same time interval, as a dashed line.

The signal 4 of the component to be investigated is compared with the reference signal 6.

In the comparison, a comparison variable 14 describing the deviation of the signal 4 from the reference signal 6 is determined.

Figure 2:
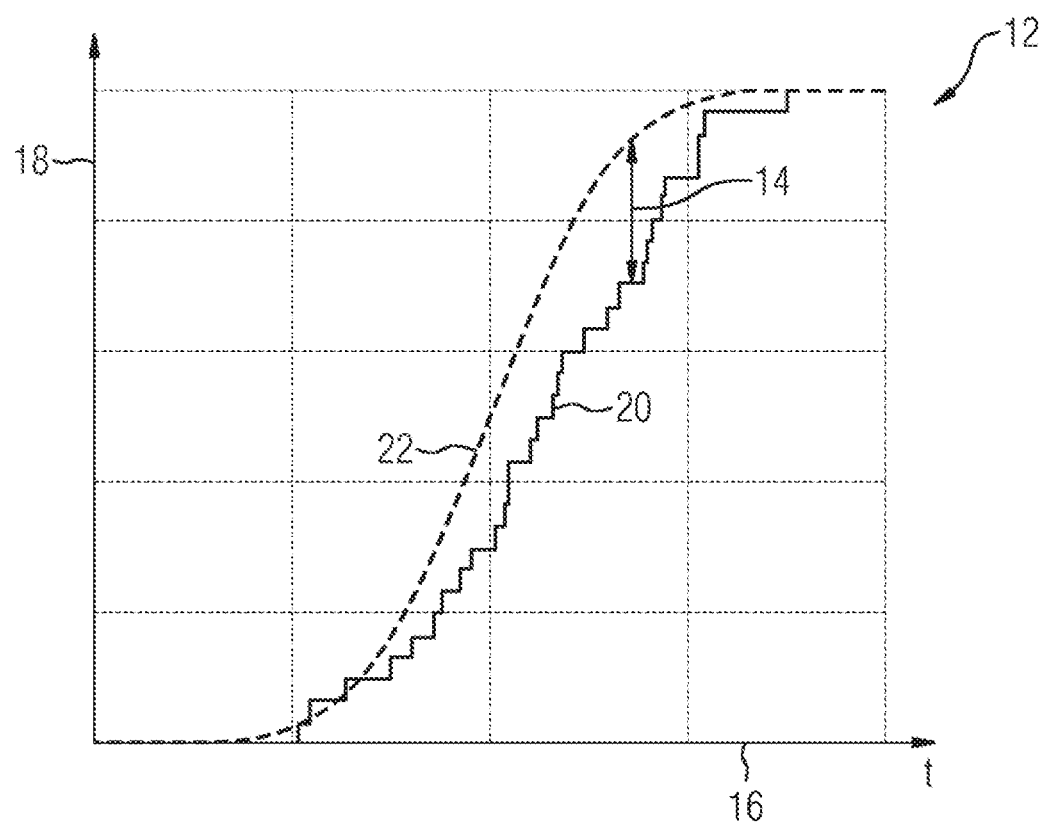

FIG. 2 shows a graph 12 for determining the comparison variable 14, which comparison variable 14 describes the deviation of a signal 4 of the component to be investigated from a reference signal 6. The signal 4 of the component to be investigated and the reference signal 6 are similar to the signals 4 and 6 shown in FIG. 1. With regard to the characteristics of the signal 4 of the component to be investigated and the reference signal 6, reference is hereby made to FIG. 1.

FIG. 2 explains an example of the calculation of the comparison variable 14. FIG. 2 does not show, in particular, the calculation of the comparison variable for the operating parameter values $x_{Ri}(t)$ shown in FIG. 1 for the signal 4 of the component to be investigated and for the reference values $\hat{X}_{Ri}(t)$ of the reference signal 6 shown in FIG. 1.

In FIG. 2 the time t is plotted on the x-axis 16 of the graph 12. On the y-axis 18 of the graph 12, the cumulative operating parameter is plotted. In this example, the cumulative temperature is plotted on the y-axis 18 of the graph 12.

To determine the comparison variable 14 the operating parameter values $x_{Ri}(t)$ are accumulated over time. The cumulative operating values $X_{Ri}$ are shown in the diagram as the solid line 20.

In addition, the reference values $\hat{X}_{Ri}(t)$ are accumulated over time. The cumulative reference values $\hat{X}_{Ri}$ are shown in the diagram 12 as the dashed line 22.

A maximum cumulative deviation $d_i$, also the maximum cumulative distance $d_i$, between the accumulated operating values $X_{Ri}$ and the accumulated reference values $\hat{X}_{Ri}$ is determined as the comparison variable. The maximum cumulative deviation $d_i$ is determined using a so-called Kolmogorov-Smirnov test statistic. The maximum cumulative deviation $d_i$ is normalized to the number of measured values N in the respective time interval, wherein here, for example, $N=\min(N_v, N_{\hat{v}})$. The comparison variable 14, here the maximum cumulative deviation $d_i$, is calculated as follows:

$$d_i := d_i(x_{R_i}, \hat{x}_{R_i}) = \frac{\sup|X_{R_i}(t) - \hat{X}_{R_i}(t)|}{N}$$

The comparison variable 14, here the maximum cumulative deviation $d_i$, is indicated in FIG. 2 by an arrow 14.

FIG. 3 shows a diagram 24 for determining a probability of occurrence of the comparison variable of FIG. 2. The graph 24 contains a predefined distribution 30 of a plurality of such comparison variables.

On the x-axis 26 of the graph 24 the comparison variable 14, here the maximum cumulative deviation $d_i$, is plotted. On the y-axis 28 of the graph 24 a frequency is plotted.

The method described under FIGS. 2 and 3 has already been carried out for multiple components as the component to be investigated, in each case for multiple rail vehicles and for multiple time intervals. In doing so a plurality of such comparison variables has been determined. On the basis of these determined comparison variables, the distribution 30 of the plurality of these comparison variables is determined.

The distribution 30 of the plurality of such distribution variables is determined by obtaining the frequencies of these determined distribution variables. In this way, an empirical frequency distribution can be determined. The empirical frequency distribution is shown in the diagram 24 in FIG. 3 as the histogram 32.

Further, in this example to determine the distribution 30 of the plurality of such comparison variables, a distribution function of a given distribution type is defined as a parametrized distribution function. The distribution function can be a distribution density function or a cumulative distribution function. In this example, a distribution density function is specified, for example. For example, the specified distribution type can be a logarithmic normal distribution or an exponential function. The parameters of the parameterized distribution function are fitted (using known methods), so that a modified distribution function is determined. The modified distribution function is shown in the diagram 24 in FIG. 3 as a solid line 34.

The modified distribution function is used to calculate the cumulative distribution function. The cumulative distribution function is shown in the diagram 24 in FIG. 3 as the dashed line 36.

A probability of occurrence of the comparison variable $d_i$ with i=1, in short $d_1$, is determined for the component $R_1$ to be investigated using the specified distribution 30 of the plurality of such comparison variables.

The probability of occurrence is then directly a measure of how anomalous the observed temperature profile is on the wheelset bearing $R_i$ to be investigated, here $R_1$.

For the probability of occurrence a limit value G is specified. In particular, the limit value G is specified before the calculation of the probability of occurrence. The limit value G can be, for example, 1% (0.01), 0.5% (0.005) or 0.1% (0.001).

If the probability of occurrence of the comparison variable $d_1$ is greater than the specified limit value G, a normal behavior of the component to be investigated is detected.

If the probability of occurrence of the comparison variable $d_1$ is less than the specified limit value G, an abnormal behavior of the component to be investigated is detected.

If the probability of occurrence of the comparison variable $d_1$ falls below the limit value G, for example, here e.g. 0.005, an alarm is generated which can be forwarded to a maintenance planning and/or maintenance control system, for example. In addition, an alarm can be generated when the probability of occurrence of the comparison variable $d_1$ falls below the limit value G several times within a predefined time interval.

Although the invention has been illustrated and described in greater detail by means of the preferred exemplary embodiments, the invention is not restricted by the examples disclosed and other variations can be derived therefrom by the person skilled in the art without departing from the scope of protection of the invention.

The invention claimed is:

1. A method for investigating a functional behavior of a component of a technical installation, the method comprising the following steps:
   comparing a signal of the component to be investigated and representing the functional behavior of the component to be investigated with a reference signal describing an average functional behavior of identical components;
   including a plurality of operating parameter values as a function of time in the signal of the component to be investigated;
   including a plurality of reference values as a function of time in the reference signal;
   accumulating the operating parameter values over time;
   accumulating the reference values over time;
   determining a maximum cumulative deviation between the accumulated operating values $X_{Ri}$ and the accumulated reference values as the comparison variable; and
   during the comparing step:
      determining a comparison variable describing a deviation of the signal from the reference signal,
      determining a probability of occurrence of the comparison variable by using a definable distribution of a plurality of such comparison variables; and
      detecting an abnormal behavior of the component based on the probability of occurrence of the comparison variable.

2. The method according to claim 1, which further comprises determining the comparison variable by using a statistical test.

3. The method according to claim 1, which further comprises determining the comparison variable by using a Kolmogorov-Smirnov test.

4. The method according to claim 1, which further comprises defining the comparison variable as a maximum Euclidean distance between the signal of the component to be investigated and the reference signal.

5. The method according to claim 1, which further comprises:
   using the signal of the component to be investigated to describe the functional behavior of the component within a specified time interval; and
   using the reference signal to describe an average functional behavior of identical components within the same time interval.

6. The method according to claim 1, which further comprises defining the reference signal as an average over a plurality of signals of a plurality of identical components of the same technical installation.

7. The method according to claim 1, which further comprises using another component of the same component type as an identical component.

8. The method according to claim 1, which further comprises using another component of the same technical installation as an identical component.

9. The method according to claim 1, which further comprises selecting an identical component as a component of another component type or of the same technical installation, the identical component responding in the same way as the component to be investigated to influences including external influences.

10. The method according to claim 1, which further comprises detecting an abnormal behavior of the component to be investigated, when the probability of occurrence of the comparison variable is lower than a specified limit value.

11. The method according to claim 1, which further comprises determining the distribution of the multiplicity of such comparison variables as follows:
   for multiple time intervals:
      comparing a signal of a respective time interval representing the functional behavior of at least one identical component with a respective reference signal describing an average functional behavior of identical components within the same respective time interval; and
   during each comparison:
      determining a comparison variable describing the deviation of the signal from the reference signal in each case, and determining the distribution of the plurality of such comparison variables based on the multiplicity of comparison variables.

12. The method according to claim 1, which further comprises determining the distribution of the plurality of such comparison variables as follows:
   for multiple components of the same component type:
      comparing a signal of a respective component representing the functional behavior of the respective component with a reference signal describing an average functional behavior of identical components; and
   during each comparison:
      determining a comparison variable describing the deviation of the signal from the reference signal in each case, and determining the distribution of the plurality of such comparison variables based on the multiplicity of comparison variables.

13. A non-transitory computer program product comprising instructions that when executed by a processor, perform the steps according to claim 1.

14. A non-transitory computer readable storage medium comprising instructions stored thereon, that when executed by a processor, perform the steps according to claim 1.

* * * * *